(12) United States Patent
Bennett et al.

(10) Patent No.: US 9,996,802 B2
(45) Date of Patent: Jun. 12, 2018

(54) QUANTUM OPTICAL SYSTEM

(71) Applicant: Kabushiki Kaisha Toshiba, Minato-ku (JP)

(72) Inventors: Anthony John Bennett, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days. days.

(21) Appl. No.: 15/434,413

(22) Filed: Feb. 16, 2017

(65) Prior Publication Data

US 2018/0107937 A1 Apr. 19, 2018

(30) Foreign Application Priority Data

Oct. 14, 2016 (GB) .................................. 1617527.5

(51) Int. Cl.
*B82Y 10/00* (2011.01)
*G06N 99/00* (2010.01)

(52) U.S. Cl.
CPC ............ *G06N 99/002* (2013.01); *B82Y 10/00* (2013.01); *Y10S 977/774* (2013.01); *Y10S 977/819* (2013.01); *Y10S 977/951* (2013.01)

(58) Field of Classification Search
CPC ..... B82Y 10/00; G06N 99/002; Y10S 977/95; Y10S 977/774
See application file for complete search history.

(56) References Cited

U.S. PATENT DOCUMENTS

| | | | |
|---|---|---|---|
| 6,720,589 B1 * | 4/2004 | Shields .................. | B82Y 10/00 257/14 |
| 7,019,333 B1 * | 3/2006 | Shields .................. | B82Y 10/00 257/13 |

(Continued)

FOREIGN PATENT DOCUMENTS

| | | |
|---|---|---|
| EP | 3 113 306 A1 | 1/2017 |
| GB | 2 443 220 A | 4/2008 |

OTHER PUBLICATIONS

United Kingdom Search Report dated Apr. 21, 2017 in Patent Application No. GB1617527.5.

(Continued)

*Primary Examiner* — Marcus Taningco
(74) *Attorney, Agent, or Firm* — Oblon, McClelland, Maier & Neustadt, L.L.P.

(57) ABSTRACT

An optical system comprising a charged quantum dot having, a charged carrier, first and second ground state levels and a plurality of excited state levels, the first and second ground state energy levels having different spin states such that the said charged carrier cannot transfer between the first and second ground state energy levels without changing its spin state, the system further comprising a controller adapted to control a first radiating beam with energy not more than 100 micro-eV from a first transition within said quantum dot from a first ground state level to a selected excited state level from the plurality of excited state levels to, the system being adapted to enhance the decay rate of a second transition within said quantum dot from the selected excited state level to a second ground state level, but not a first transition, such that a photon is produced due to scattering of a photon from the first radiating beam, (Continued)

wherein the controller is adapted to irradiate the quantum dot with the first radiating beam for a time longer than the radiative lifetime of the selected excited state to produce just one photon, and wherein the first radiating beam comprises at least one pulse.

20 Claims, 8 Drawing Sheets

(56) References Cited

U.S. PATENT DOCUMENTS

| | | | | |
|---|---|---|---|---|
| 7,132,676 | B2 * | 11/2006 | Shields | B82Y 20/00 257/14 |
| 8,227,830 | B2 * | 7/2012 | Bennett | B82Y 10/00 257/103 |
| 2003/0063748 | A1 * | 4/2003 | Shields | B82Y 20/00 380/256 |
| 2009/0022192 | A1 * | 1/2009 | Itoh | B82Y 10/00 372/44.01 |
| 2013/0256504 | A1 * | 10/2013 | Stevenson | G02F 1/2257 250/201.1 |

OTHER PUBLICATIONS

Andreas V. Kuhlmann, et al., "Transform-limited single photons from a single quantum dot" Nature Communications, vol. 6, 2015, 6 pages.

* cited by examiner

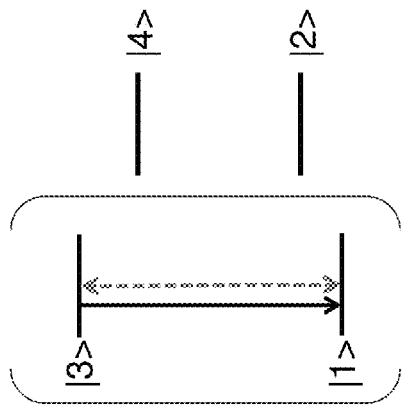
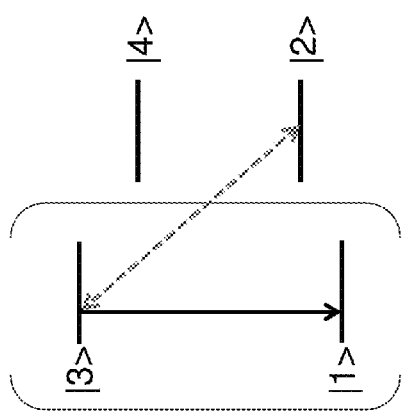
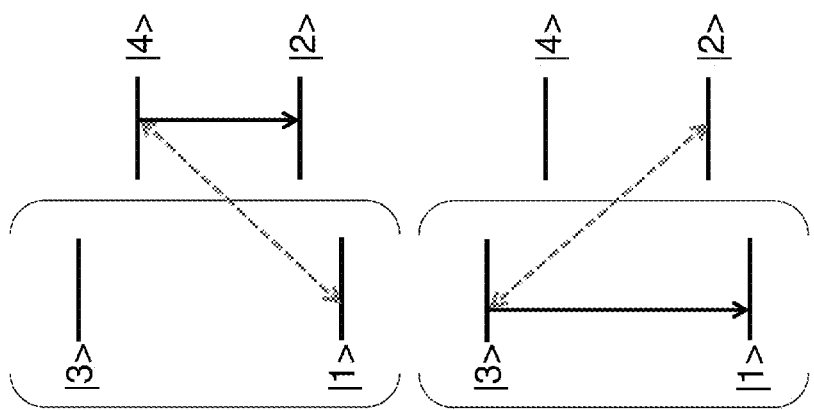

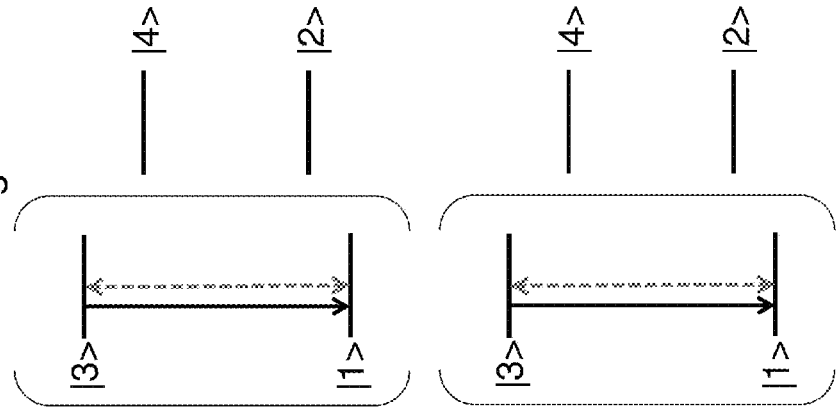
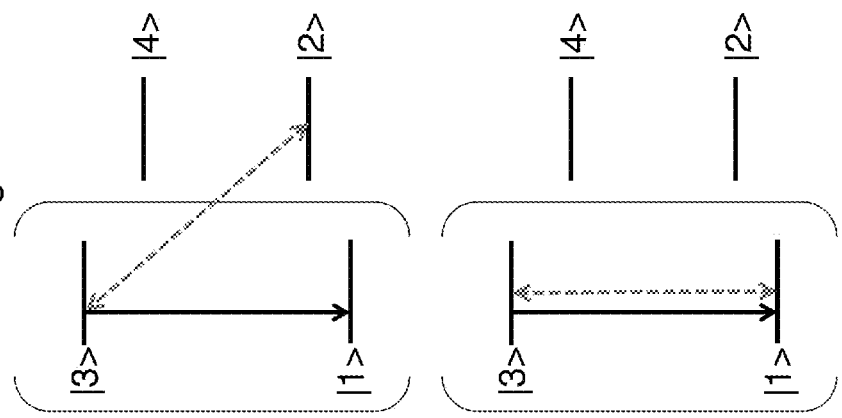
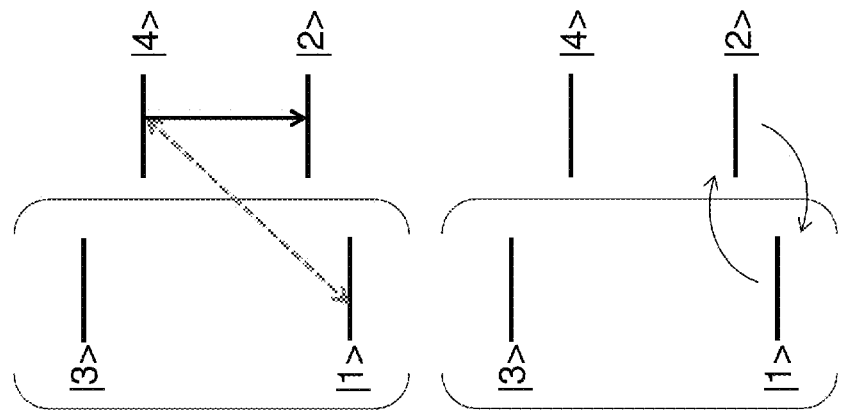

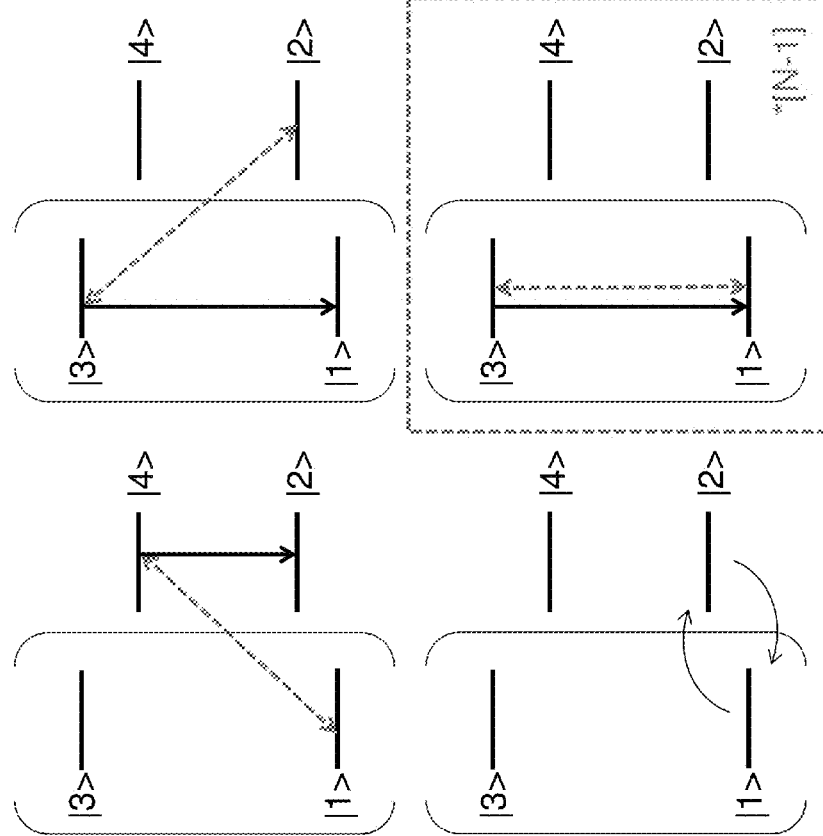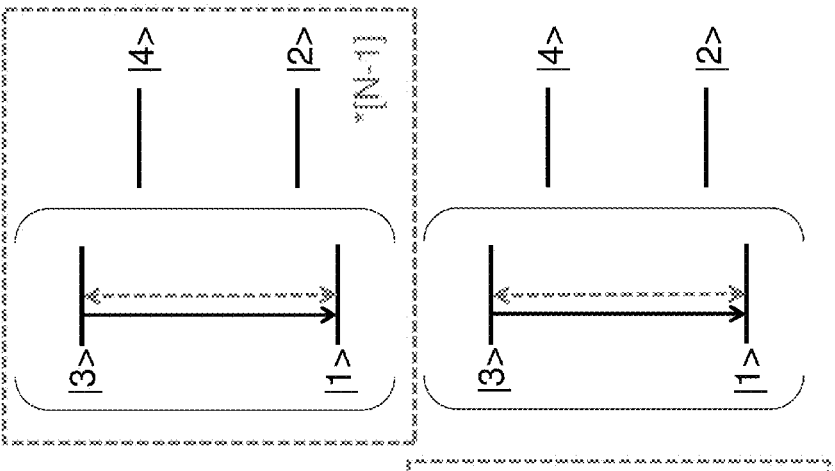

Photonic crystal

Pillar microcavity

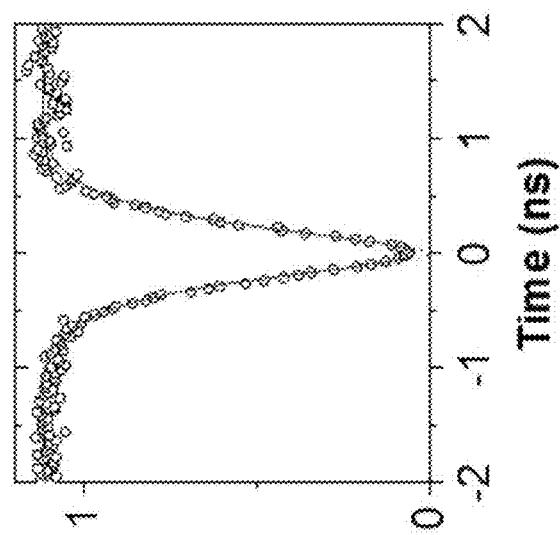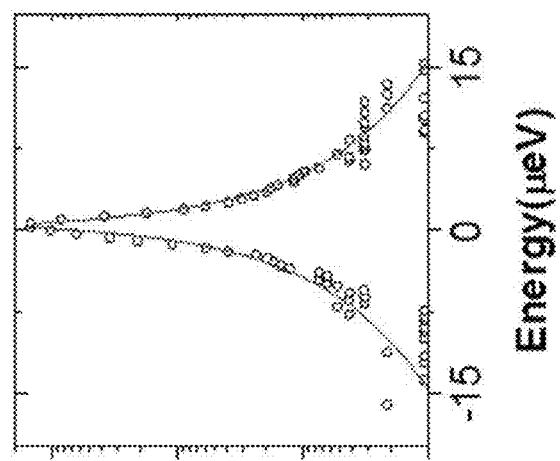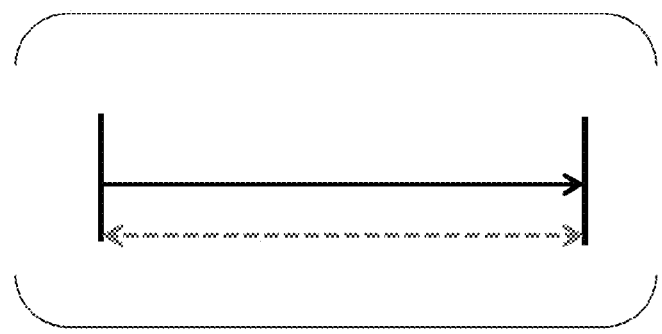
Figure 8A
Figure 8B
Figure 8C

QUANTUM OPTICAL SYSTEM

FIELD

Devices and systems in accordance with embodiments are concerned with the field of quantum optics

BACKGROUND

In the field of quantum optics there is a need to generate photons deterministically quantum light states displaying the properties of photon number squeezing, coherence, superposition and entanglement.

Such a need lies in the field of quantum computing, metrology, sensing. Further, there is a need for the generation of entangled photon states and the creation of coherent photons of arbitrary shape and length.

BRIEF DESCRIPTION OF THE FIGURES

Devices in accordance with embodiments of the present invention will now be described with reference to the following figures in which:

FIG. 3A shows the preparation of the initial state in a sequence of excitations in accordance with an embodiment of the present invention used to produce a controlled photon output;

FIG. 3B schematically shows an excitation of the 2-3 transition to produce a superposition of states in the ground state in the sequence of excitations used to produce the controlled photon output;

FIG. 3C shows the application of a control pulse to further modify the superposed state in the sequence of excitations used to produce the controlled photon output;

FIG. 3D shows a final excitation of the 2-3 transition in the sequence of excitations used to produce the controlled photon output;

FIG. 4A shows the preparation of the initial state in a sequence of excitations in accordance with an embodiment of the present invention used to produce an entangled photon pair;

FIG. 4B schematically shows an excitation of the 2-3 transition to produce a superposition of states in the ground state in the sequence of excitations used to produce the entangled photon pair;

FIG. 4C shows the application of a beam of radiation to supply a second photon for entanglement dependent on the superposition in the sequence of excitations used to produce the entangled photon pair;

FIG. 4D shows a population inversion between the two ground states in the sequence of excitations used to produce the entangled photon pair;

FIG. 4E shows a further excitation of the 1-3 transition to produce one of two final states for entanglement in the sequence of excitations used to produce the entangled photon pair;

FIG. 4F shows a further excitation of the 1-3 transition to produce the other of the two final states for entanglement in the sequence of excitations used to produce the entangled photon pair;

FIG. 5A shows the preparation of the initial in a sequence of excitations in accordance with an embodiment of the present invention used to produce an entangled photon pair;

FIG. 5B schematically shows an excitation of the 2-3 transition to produce a superposition of states in the ground state in the sequence of excitations used to produce the entangled photon pair;

FIG. 5C shows the application of a beam of radiation to supply a second photon for entanglement dependent on the superposition in the sequence of excitations used to produce the entangled photon pair;

FIG. 5D shows a population inversion between the two ground states in the sequence of excitations used to produce the entangled photon pair;

FIG. 5E shows a further excitation of the 1-3 transition to produce one of two final states for entanglement in the sequence of excitations used to produce the entangled photon pair;

FIG. 5F shows a further excitation of the 1-3 transition to produce the other of the two final states for entanglement in the sequence of excitations used to produce the entangled photon pair;

FIG. 8A shows a measurement of coherent photon scattering when the laser and detected photon are at the same energy;

FIG. 8B shows a measurement of coherent photon scattering when the laser and detected photon are at the same energy; and FIG. 8C demonstrates the laser and the detected proton are at the same energy.

DETAILED DESCRIPTION OF THE FIGURES

Figure 1:
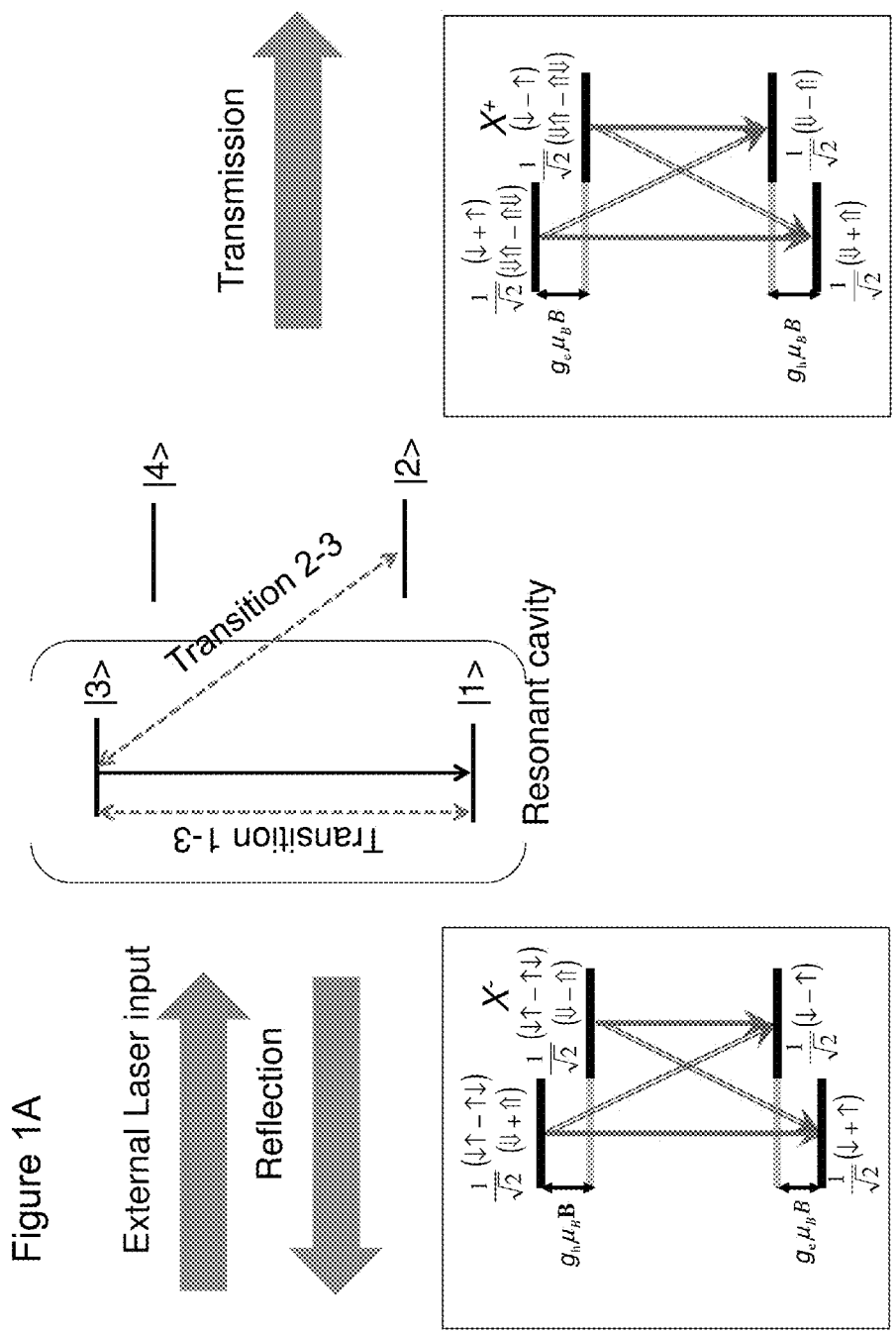
FIG. 1A is a diagram showing the energy levels in a quantum dot.
FIG. 1B shows the spin states associated with an electron in the quantum dot of FIG. 1A.
FIG. 1C shows the spin states associated with a whole in the quantum dot of FIG. 1A.

In one embodiment, optical system is provided comprising a charged quantum dot having, a charged carrier, first and second ground state levels and a plurality of excited state levels, the first and second ground state energy levels having different spin states such that the said charged carrier cannot transfer between the first and second ground state energy levels without changing its spin state, the system further comprising a controller adapted to control a first radiating beam with energy not more than 100 micro-eV from a first transition within said quantum dot from a first ground state level to a selected excited state level from the plurality of excited state levels, the system being adapted to enhance the decay rate of a second transition within said quantum dot from the selected excited state level to a second ground state level, but not a first transition, such that a photon is produced due to scattering of a photon from the first radiating beam, wherein the controller is adapted to irradiate the quantum dot with the first radiating beam for a time longer than the radiative lifetime of the selected excited state to produce just one photon, and wherein the first radiating beam comprises at least one pulse.

Thus the first irradiating beam can be single pulse or a plurality of pulses. In some embodiments, further pulses such as control pulses are interspersed between the pulses of the first irradiating beam.

This can be thought of as the controller being adapted to excite the first transition such that the Raman scattered photon has a photon length that is longer than the radiative lifetime of the selected excited state transition. The photon length being measured from the start to the end of the photon in time. This is a statistical measurement which will be described later.

Raman scattering is the inelastic scattering of a photon upon interaction with matter. In the above embodiment, the scattered photon has a different energy to the original incident photon.

By the provision of two ground state levels with different spin states, the charged carrier will need to undergo a spin-flip transition. This is considerably longer than the radiative decay time from an excited state to a ground state and thus it is possible to produce coherent single photons with a coherence time much longer than that possible using decay of an excited state. The above allows coherent scattered light from a single quantum dot in a cavity. The Raman scattering process can allow long photons to be generated. As will be shown below, further manipulations can lead to complex entangled states and photon-photon gates. Microphone off In an embodiment, the first radiating beam is a pulsed beam with each pulse having a single intensity maximum, a pulse length greater than the selected excited state lifetime and the controller is adapted to control the pulse area to transfer all spin in the first ground state to the second ground state.

In a further embodiment, the controller is further adapted to control a second radiating beam that radiates the quantum dot at an energy within 100 micro-eV of the second transition energy, the said second radiating beam being a control beam, the control beam being applied to the quantum dot between two or more pulses of the first radiating beam, the controller being configured to control the first radiating beam such that the charged carrier has an energy state which is a superposition of the first and second ground state energy levels prior to the application of the control beam.

The optical system may be configured as a source of entangled photons, wherein the controller is configured to control the first radiating beam such that the charged carrier has a superposed energy state which is a superposition of the first and second ground state energy levels, the controller being further adapted to control a second radiating beam to scatter at least one further photon to produce an entangled photon pair using said superposed energy state.

In the above embodiment there is an enhancement to the second transition which increases its decay rate, but which is not applied to the first transition. This will be explained in more detail with reference to FIGS. 4A-4F.

The above can be extended to a source of n entangled photons, where n is an integer of at least 2, the controller being configured to control the second radiating beam to scatter at a plurality of photons to produce entangled photons using said superposed energy state.

The controller may be configured to prepare the charged carrier in the first ground state level prior to irradiating with the first beam.

In an embodiment, the first and second ground state levels are produced by an in-plane magnetic field.

The decay rate of the second transition may be enhanced in a number of ways, for example, by a cavity tuned to the frequency of the desired transition or by a waveguide.

The system may be adapted to selectively enhance the decay rate of second transition, but not a first transition, by only supporting a light polarisation that couples to the second transition and not first.

In a an embodiment, the first radiation beam is a narrow band beam having a linewidth less than the radiative linewidth of the transition. For the avoidance of doubt, the linewidth considered here is the linewidth measured upon exciting the system for spontaneous emission and not Raman scattering, but usually 1-10 microeV in quantum dots.

In a further embodiment, a filter is provided that is adapted to pass the Raman scattered photons out of the system.

The carrier in the ground state of the quantum dot may be an electron or hole.

In an embodiment, the system changes the probability of decay from the selected excited state to the second ground state to be greater than the probability of decay from the selected excited state to the first ground state.

In an embodiment, a photon created from irradiation the first radiating beam has a length less than the lifetime of the spin in the ground state. Further, in an embodiment, the lasers are not detuned from the transitions.

In a further embodiment, a method of operating an optical system is provided, wherein the optical system comprises a quantum dot comprising a charged carrier, first and second ground state levels and a plurality of excited state levels, the first and second ground state energy levels having different spin states such that the said charged carrier cannot transfer between the first and second ground state energy levels without changing its spin state, the method comprising:
irradiating the quantum dot a first radiating beam with an energy not more than 100 micro-eV from a first transition within said quantum dot from a first ground state level to a selected excited state level from the plurality of excited state levels,
wherein the system is adapted to enhance the decay rate of a second transition within said quantum dot from the selected excited state level to a second ground state level, but not a first transition, such that a photon is produced due to scattering of a photon from the first radiating beam, and
wherein the quantum dot is irradiated with the first radiating beam for a time longer than the radiative lifetime of the selected excited state to produce just one photon, and wherein the first radiating beam comprises at least one pulse.

In a further embodiment, the first radiating beam is a pulsed beam with each pulse having a single intensity maximum, a pulse length greater than the selected excited state lifetime, and the pulse area is controlled to transfer all spin in the first ground state to the second ground state.

In a further embodiment, a second radiating beam radiates the quantum dot at an energy within 100 micro-eV of the second transition energy, the said second radiating beam being a control beam, the control beam being applied to the quantum dot between two or more pulses of the first radiating beam, the first radiating beam being controlled such that the charged carrier has an energy state which is a superposition of the first and second ground state energy levels prior to the application of the control beam.

In a further embodiment, the method is configured to produce entangled photons, wherein the first radiating beam radiates the quantum dot such that the charged carrier a superposed energy state which is a superposition of the first and second ground state energy levels, and wherein a second radiating beam radiates the quantum dot at an energy within 100 micro-eV of the second transition energy, the said second radiating beam being a control beam, the controller being further adapted to control a second radiating beam to scatter at least one further photon to produce an entangled photon pair using said superposed energy state.

FIG. 1A is a schematic of a quantum dot which is configured as a four level emitter having two ground states |1>, |2> and two excited states |3>, |4>. In this arrangement, the two ground states |1>, |2> are optically coupled to a common excited state |3>.

Further, as will be explained later with reference to FIGS. 6A and 6B, one of the ground-to-excited-state transitions is enhanced by photonic engineering of the structure. This results in a lower decay time for this transition and thus preferential enhancement of this transition. This photonic engineering may be achieved by a cavity tuned to the wavelength of the preferred transition, a guided mode of a waveguide similarly tuned etc. Alternatively, a photonic structure with broad energy response, such as a waveguide could also be used to selectively enhance one transition, if it supports a light polarisation compatible with the second transition and not the first. It is also possible to suppress the decay from the 2-3 transition. In other words, the preferential enhancement serves to change the relative decay rates 2-3 and 1-3.

In the field of quantum dots the structure of FIG. 1A may be realised by addition of a single charged carrier to a quantum dot in a magnetic field. In the case of a quantum dot subject to a magnetic field in the plane of the sample, the addition of a single electron (hole) to the quantum dot results in the two energy levels |1>, |2> in FIG. 1A. Absorption of a photon, which creates an electron-hole pair, moves the system to the upper states |3>, |4> which consist of 2 electrons and 1 hole as there was an electron in the structure prior to excitation (or 1 electron and 2 holes, if there was 1 hole prior to excitation.) It should be noted that in Raman scattering, there is not the creation of an electron-hole pair, although it is necessary to understand the concept of the excited states |3>, |4> for reasons that will be described later.

FIG. 1B shows the energy levels resulting from a quantum dot charged with an extra electron, which displays emission from the negatively charged exciton state X−. FIG. 10 shows the energy levels resulting from a quantum dot charged with an extra hole, which displays emission from the positively charged exciton state X+.

Optical transitions, shown by arrows, result in the emission of a single photon. Said photon does not carry charge, so can only result from the recombination of one electron and one hole. Conversely optical excitation, where one photon excites the system, results in the addition of an electron and a hole.

For a magnetic field in the plane of the sample the ground state energy levels (1 and 2) are separated in energy by a factor $g_{e/h}*\mu_B*B$, where g is the "g-factor" of a single electron, e (hole,h), $\mu_B$ is the Bohr magneton (58 micro-eV/T) and B is the magnetic field applied. In the example of FIG. 1B the spin of the electron in the lowest energy state is a superposition of electron-spin-up (↑) and spin-down (↓). In the example of FIG. 10 the spin of the hole in the lowest energy state is a superposition of hole-spin-up (⇑) and spin-down (⇓). Similarly, the upper states in FIGS. 1B and 1C are superpositions of the carriers spins. To simplify notation in the remainder of this document these will be referred to as states 1-4, as shown in FIG. 1A.

Due to the conservation of spin, the transitions shown in the figure have a well-defined polarisation (the photon carries away the change in spin from the electron and hole that recombine). The vertical transitions shown by solid arrows have certain linear polarisation, and the diagonal transitions shown by double-line arrows have an opposite linear polarisation.

Optical sources such as lasers are used to optically address the transitions.

Said quantum emitter could be an InGaAs quantum dot formed in GaAs semiconductor, and InGaAs dot formed in InP, a GaAs QD formed in AlGaAs, a defect in diamond with a spin in its ground state, a defect in a 2-dimensional material such as WSe or $WS_2$ or some other system.

As mentioned above, a cavity may be used to selectively enhance the transition 1-3 as shown in FIG. 1A. This cavity will be of sufficiently high quality factor (Q) and sufficiently low mode volume (V) that the local optical density of states at the position of the emitter is increased at the energy of the transition |1> to |3>, relative to what would be seen in the absence of the cavity. Designs of cavity or optical structure that can change the optical density of states will be discussed later with reference to FIGS. 6A and 6B. Alternatively, a photonic structure with broad energy response, such as a waveguide or a cavity with small mode volume and poor quantity factor, could also be used to selectively enhance one transition, if the said photonic structure supports a light polarisation compatible with the second transition and not the first.

Resonant optical addressing of the transitions in the quantum emitter is made by external light sources, which may be lasers. These light sources must be largely resonant with the transitions 1-3 and 2-3, within 100 micro-eV of the stated transitions. For simplicity we discuss the case where the lasers are resonant with the transitions in the remainder of this document. Their spectral width should be narrow with respect to the energy width of the transitions in the quantum emitter defined by the optical transitions radiative lifetime. The width of the transition in energy, dE, is limited to $dE=\hbar/\tau_{rad}$, where $\tau_{rad}$ is the radiative lifetime.

Optical transitions between the states must preserve energy and a quantum mechanical property called spin (electrons have spin ±½ and photon have spin ±1, for example). This means that in FIGS. 1A-1C illumination of the dot at the energy of transition 2-3, which results in the carrier spin being moved from state 2 to state 1, must (by conservation of energy) create a Raman photon of energy 1-3. This transfer from state 2 to 1 also results in a change of spin for the ground state charge, said spin change being carried away by the photon generated. The resulting carrier spin in state 1 cannot be transferred back to state 2 easily, because this would involve a change in both energy and spin.

In an embodiment, for operation of the invention the spin must be stable in state 1 over a time much greater than the optical pulses. In InGaAs quantum dots this is achieved by careful design of the hetero-structure around the quantum dot to reduce the density of defects which may assist the carriers in escaping from the dot, or dephasing. It is possible for pure spin in these systems to be stable over the microsecond range.

Figure 2:
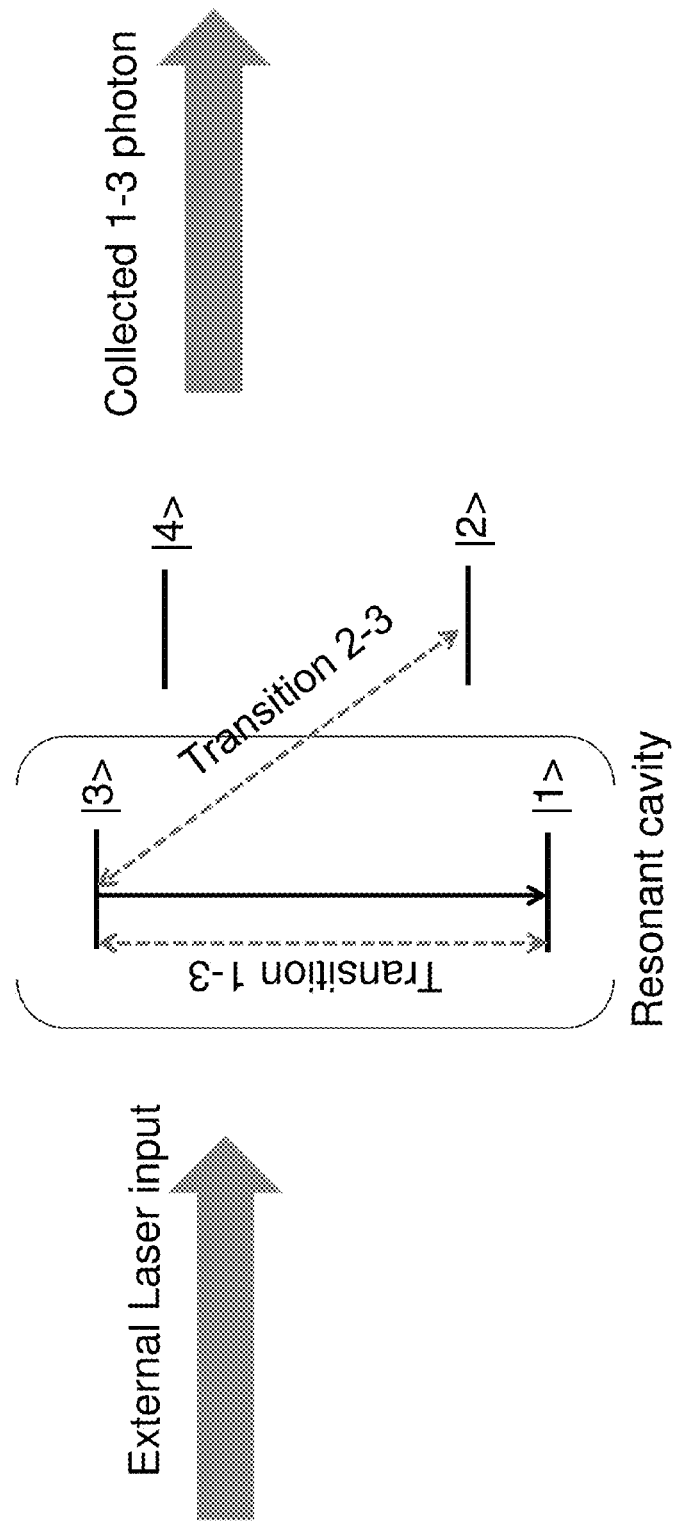
FIG. 2 is a further diagram showing the energy levels in the quantum dot of FIG. 1A and the external laser input and photon collection in accordance with an embodiment of the present invention.

How the system is used to generate a single photon whose length is long compared to the radiative lifetime of the excited states 3 and 4 in the emitter will now be explained with reference to FIG. 2. It should be noted that the length of a single photon can be determined via time-resolved measurement with a fast photo-detector. For example, a plurality of photons output under the same conditions would be measured and the distribution or arrival times at the detector would approximate the temporal length and shape of the photon.

In single quantum emitters that work on the creation of an electron-hole pair, the emitter works on the principle that the excited state in the dot can only contain one excitation at a time. This is due to the Pauli exclusion principle. After the excitation has decayed by emission of a photon in spontaneous emission the system resides in the ground state and cannot emit a second photon until it is re-excited (after time $T_{re}$) and has decayed again ($T_{decay}$). Thus photons can be spaced out by a time ($T_{re}+T_{decay}$), which is referred to as anti-bunching. In quantum dots this time is typically 1-10 ns.

In contrast, the current embodiment leads to anti-bunched photons for a different physical reason, which is the long spin-flip time of a single spin in the ground states 1 or 2 (longer than micro-second timescale). Instead of exciting the system and waiting for spontaneous emission Raman photons are driven coherently from 2 to 1, via 3 to generate a single photon. The use of a narrow band laser to drive this Raman process ensures that no population can be transferred out of state 1. The process cannot start again until the spin is returned to state 2.

In an embodiment a long optical pulse from a narrow band optical laser can be used to drive the Raman process, generating a photon that has a linewidth close that of the laser and a photon length greater than the radiative lifetime of state 3. Such photons are compatible with quantum memories based on rare earth ions in solids and with the narrow optical transitions seen in single atoms and ions, enabling optical technologies based on the best features of both semiconductor quantum dots and long qubit storage times in the aforementioned quantum memories. Furthermore, commercially available optical intensity modulators can be used to shape the laser pulse accurately (these have a response time in the 100s of ps). There is an advantage in being able to make arbitrarily shaped photons in quantum optics: as an example to optimally excite a two level transition with a single photon that photon should have a sharp leading edge followed by an exponentially decaying tail.

It should be noted that any linewidth laser can be used. However, in an embodiment, the linewidth of the laser should be less than or equal to the $\hbar$/"photon length in time". Where $\hbar$ is the reduced Planck constant.

Photon shape refers to the photon's electric field intensity as a function of time. Modification of a photon's shape can be achieved with a variable intensity modulator driven by an electrical signal generator. Ideally, modification of the photon's intensity as a function of time will not change its spatial distribution, spectrum or the phase of the light. In an embodiment, a cavity resonant with the transition 1-3 ensures that the Raman process is efficient. In a lateral magnetic field without a cavity present all transitions 1-3, 2-4, 1-4 and 2-3 would have equal strength. The use of a cavity imparting a Purcell effect onto the transition 1-3 is to preferentially enhance this transition, thus a laser driving the transition 2-3 will be more likely to generate a Raman photon at energy 1-3 than to lead to a photon at energy 2-3. This photonic structure will be discussed in detail with reference to FIGS. 6A and 6B, but could selectively enhance decay by transition 1-3 using (i) energy i.e. having an energy resonant with 1-3 and not with the other transitions or (ii) be designed to sustain an optical polarisation that is compatible with photons from 1-3 and not the other transitions (iii) suppress all transitions other than 1-3 by reducing the optical density of states for those transitions.

In the above device the photons emitted from the 1-3 transition are collected and not the laser used to drive the system. This could be achieved with a narrow spectral filter resonant with transition 1-3 only. Alternatively, or in addition, a polarisation filter could be used that will selectively pass light from transition 1-3 but not the laser.

In the above embodiment, it is not necessary to prepare the spin in the ground states 1 and 2 prior to the start of the laser pulse that is resonant with 2-3. In this case the spin will be in an incoherent mix of the two states 1 and 2 and there will be, on average, only 1 photon generated for half of the excitation cycles.

In a further embodiment, the spin in state 2 is prepared prior to the start of the laser pulse at energy 2-3. This can be achieved by (i) optically driving the transition 1-4 for a time sufficient to prepare the spin in state 2 or (ii) using a heterostructure in the semiconductor to selectively tunnel in carriers at the energy of 2.

FIGS. 3A-3D show a further embodiment of the present invention, we show how a single "control" photon can be used to impart a phase shift to a second "target" photon. This is a basic operation in the function of a photonic gate. FIGS. 3A-3D respectively show steps (i) to (iv).

In step (i) as shown in FIG. 3A the system is prepared in state 2, which in one embodiment may be achieved by optical pumping. For example, photons may be excited to state 4 and allowed to decay to state 2.

In this embodiment, in step (ii) as shown in FIG. 3B, the 2-3 transition is excited as described with reference to FIGS. 1A, 1B, 1C, and 2. However, here, the pulse is chosen to have a particular area (amplitude multiplied by length) such that it is called a $\pi/2$ pulse and results in a photon 50% of the time. Thus, there is not complete population transfer from state 2 to state 1 and the energy state of the carrier is in a superposition of the energy states of the first and second levels after step (ii) of FIG. 3B.

In this superposed state, the state can be further modified using a control pulse in step (iii) as shown in FIG. 3C. The transition 2-3 and the transition 1-3 are excited using lasers under the control of a controller (not shown). The controller being adapted to control the pulse shape.

In step (iii) as shown in FIG. 3D, the controller switches back to radiating the 2-3 transition as in FIG. 3B. However, in FIG. 3D, the pulse area is selected as a pi pulse completely transfer all remaining population of spin in level 2 to level 1. Although the 2-3 transition is excited in two steps, the process is best understood viewing FIGS. 3B and 3D as a single step with two optical pulses. This step is interrupted application of the control pulse to the quantum dot.

The two optical pulses (FIGS. 3B and 3D) separated in time and at energy 2-3 and with a pulse areas of pi/2 and then pi, respectively, scatter from the emitter creating the "target" photon. This single Raman photon at energy 1-3 which is shared between two time bins, but have a common coherence provided the two pulses at energy 2-3 are coherent (for instance derived from the same laser). In principle the incident pulse could be a single photon, or a laser pulse, shared across two time bins. If the incident pulse is derived from a laser only a single photon can be scattered. In this example the state of the photon is $[E_{ii}+E_{iv}]$, with the subscript denoting the two times of the different bins. In accordance with the present invention, the time spacing of these two parts can be widely separated, in one embodiment up to the pure spin lifetime and the coherence of the state will be limited by the coherence of the spin in states 1 and 2.

The invention allows a photon-photon gate operation by imparting a conditional phase shift to the "target" Raman photon. This is achieved with a second optical pulse (the "control" pulse) at energy 1-3 incident on the system between steps (ii) and (iv). This is drawn as step (iii) in FIG. 3C. The "control" pulse is in a superposition of two parts, one of which can scatter from transition 1-3 and one which cannot. For instance this superposition could be a polarisation qubit, only one linear polarisation of which will scatter from the 1-3 transition. Alternatively, the control pulse could be itself in a superposition of two times, one of which is incident on the system between steps (ii) and (iv) and one of which is outside of this range, such as $[E_0+E_{iii}]$. The presence of the cavity resonant with transition 1-3 ensures step (iii) can be highly efficient.

However, the photon at energy 1-3 which was incident on the system between these two Raman photons will impart a phase shift to the Raman photon. In this example the polarisation-qubit on the single photon in step (iii) has changed the phase qubit encoded on the Raman photon in step (ii) and (iv). This is a conditional phase shift gate:

Target photon: $[E_0+E_{iii}]$

Control Photon: $[E_{ii}+E_{iv}]$

State after gate: $[E_0,E_{ii}+E_{iii},E_{ii}+E_0,E_{iv}+e^{i\theta}E_{iii},E_{iv}]$ Where $\theta$ is the conditional phase imparted by the step (iii). In an embodiment this phase would be $\pi$.

The above system forms the basis for an entangled photon source as shown in FIGS. 4A-4F. Here an embodiment is shown where a pair of degenerate time-bin entangled photons are generated with high efficiency, that retain the spectral properties of the laser i.e. have high coherence. This is in contrast with other schemes to entangle photons using quantum dots that rely upon spontaneous emission, and thus result in photons that have their spectral properties limited by the solid state environment. Typically this means the photons have linewidths>4 micro-eV in spontaneous emission, whereas using the scheme here the photons have an energy largely comparable to that of the laser which may be of the order of nano-eV or less.

The process is as follows:

Step (i) as shown in FIG. 4A Preparation of the spin into state 2 using an optical pulse resonant with transition 1-4, of sufficient length and intensity to ensure the spin is in state 2. This step can be performed without monitoring the device emission, but the detection of a single photon at energy 2-4 will herald the transfer of spin to state 2.

Step (ii) as shown in FIG. 4B a laser at energy 2-3 creates a Raman photon at energy 1-3. This laser pulse is chosen to have a particular area (amplitude multiplied by length) such that it is called a $\pi/2$ pulse and results in a photon 50% of the time. At this point the system is entangled in the state $[|1,E_{ii}\rangle+|2, 0_{ii}\rangle]$ where $E_{ii}$ denotes a photon at the time of (ii) was emitted and $0_{ii}$ denotes no photon.

Step (iii) as shown in FIG. 4C A laser at energy 1-3 scatters from transition 1-3. This can be a very efficient process that does not change the populations in 1 and 2, because the transition from 1-3 is strongly enhanced by the cavity. The system is now in the entangled state $[|1,E_{ii},E_{iii}\rangle+|2, 0_{ii}, 0_{iii}\rangle]$. This can be thought of as the transition reflecting one photon from the laser: it has been shown that the transition can only reflect one photon at a time.

Step (iv) as shown in FIG. 4D The populations of transitions 1 and 2 must be swapped coherently, which can be achieved with an off resonant laser pulse. This results in the entangled state $[|2,E_{ii},E_{iii}\rangle+|1, 0_{ii},0_{iii}\rangle]$. This can be achieved by illuminating the quantum dot with a bright optical pulse, a few picoseconds in length, of circular polarisation, that has energy 1-3 meV detuned from all transitions in the system. This pulse does not create carriers in the system (there is no excitation) but does enact a rotation of the quantum bit stored in states 1 and 2.

Step (v) as shown in FIG. 4E A pulse at energy 1-3 scatters from the transition to create the state $[|2,E_{ii},E_{iii},0_v\rangle|1, 0_{ii}, 0_{iii},E_v\rangle]$.

Step (vi) as shown in FIG. 4F A pulse at energy 1-3 scatters from the transition to create the state $[|2,E_{ii},E_{iii},0_v,0_{iv}\rangle+|1, 0_{ii},0_{iii},E_v,E_{vi}\rangle]$.

Finally, in step (vii) the state of the spin must be destroyed, for example by tunnelling out of the system. This leaves the entangled state $[|E_{ii},E_{iii},0_v,0_{iv}\rangle+|0_{ii},0_{iii},E_v,E_{vi}\rangle]$.

This is not shown.

By this method an entangled state is created from photons that have the coherence of the laser (not limited by dephasing in the quantum emitter). For an efficient cavity this photonic state has the additional advantage of a well-defined photon number (it consists of only 2 photons, no more and no less).

In a further embodiment, as shown in FIGS. 5A-5F, the method described with relation to FIGS. 4A-4F is extended to create a quantum entangled state over more than 2 photons. This has applications in quantum metrology, quantum computing and quantum secret sharing. The photonic state produced is called a N00N state. This state has a N photons coherently shared across two modes in the state $[|N,0\rangle+|0,N\rangle]$. This state offers a quantum advantage in measurement of a small phase shift, beyond what can be achieve by a classical light source.

FIGS. 5A-5F show the operation of the device to create a NOON state. The operation of the invention proceeds along similar lines to what is shown in FIGS. 4A-4F but the steps (c) and steps (e) are repeated [N−1] times. This creates a photonic state that either has N photons in the first N time bins or N photons in the final N time bins.

Figure 6B:
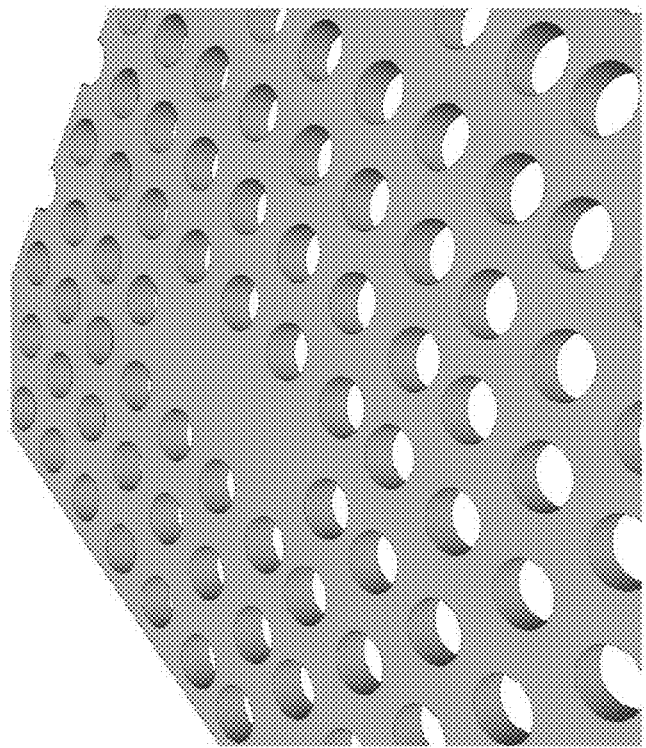
FIG. 6B is a schematic of a photonic crystal.
Figure 6A:
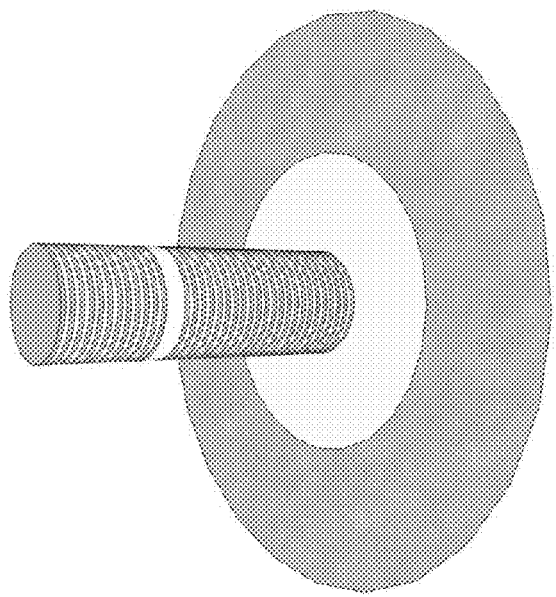
FIG. 6A is a schematic of a pillar microcavity.

FIGS. 6A and 6B show schematic images of cavities in accordance with embodiments. Other cavity designs are possible.

FIG. 6A is a "pillar microcavity" with diameter 1-5 microns etched into a semiconductor structure. This comprises a bottom mirror of alternating $\lambda/4n$ layers of GaAs (cream colour) and $Al_xGa_{x-1}As$ (pink colour) where the Aluminium content of the alloy, x, is close to 1 and $\lambda$ is the wavelength in free space and n the refractive index of the layer. In the example shown the bottom mirror consists of 15 or more repeats of the quarter wavelength layers, alternating between GaAs and AlGaAs. The central spacer consists of GaAs which is an integer number of half wavelengths thick, for example one wavelength, $\lambda/n_{GaAs}$. Positioned in this cavity is a layer of quantum emitters, designed to be located at a maximum in the electric field. Above the spacer is a second mirror of 5 or more repeats. To ensure most light from the dot exits in the upper direction this cavity will typically have a lower reflectivity (achieved by using a lower number of repeats.)

In FIG. 6B a 2D photonic crystal is shown comprising a (100-300 nm thick) slab of GaAs containing quantum emitters at its center and patterned with holes in a triangular lattice, which are selected to suppress emission sideways from a quantum emitter in the center of the device. A cavity may be formed in this photonic crystal by not removing a number of holes, such as in the example where 3 holes in a line have not been formed. Such a cavity can have a very high quality factor and low mode volume, leading to strong enhancement of optical transitions located in a quantum emitter resonant with the mode.

Figure 7B:
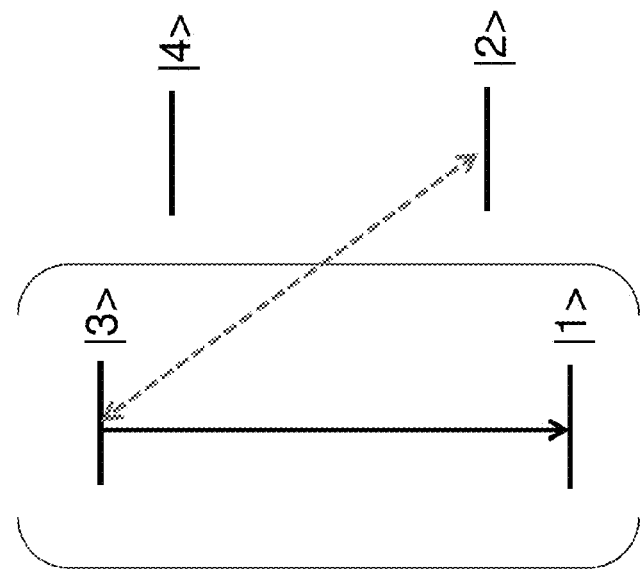
FIG. 7B shows the transition relevant to this data.
Figure 7A:
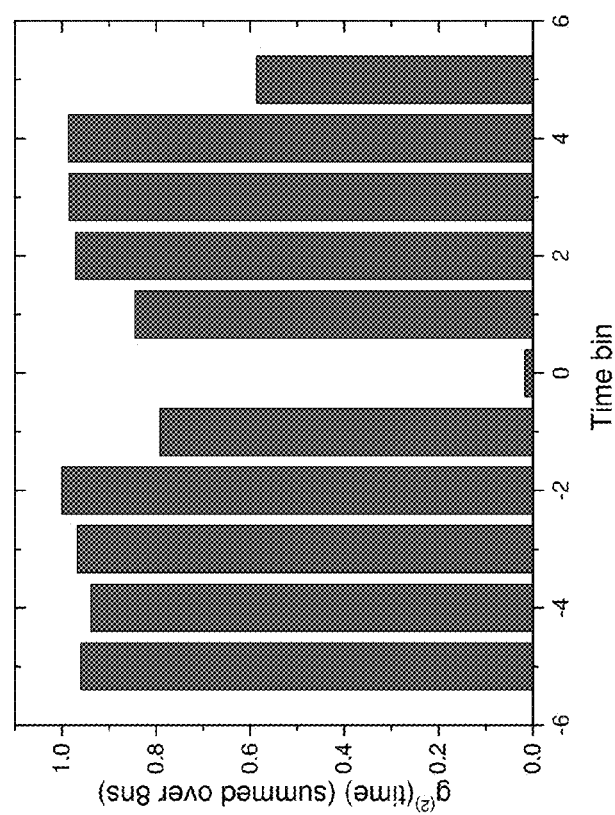
FIG. 7A shows experimental data in accordance with an embodiment of the present invention.

FIGS. 7A and 7B show experimental data in accordance with an embodiment of the present invention. In this data a quantum dot in a pillar microcavity at a magnetic field of 9T is excited by a 4 ns coherent pulse resonant with transition 2-3 when the lifetime of transition 3 is ~100 ps. This generates a single photon coherent with the laser. Despite the optical pulse being 40× greater than the excited state lifetime the device generates a single photon each cycle (between each cycle the spin was transferred back from the state 1 to 2 by another optical pulse).

FIGS. 8A-8C show a measurement of coherent photon scattering when the laser and detected photon are at the same energy. In this case a CW coherent laser was used to drive the transition resulting in the strong anti-bunching emission shown in FIG. 8A. Spectral measurement of the emitted quantum light (data points in FIG. 8B) displayed a similar width to the spectral resolution of the instrument (0.78 micro-eV) suggesting the linewidth of the photons is extremely narrow, much less than would be possible with spontaneously emitted photons. This is the same process by which photons are generated in the steps of FIGS. 4C and 4E, FIGS. 5C and 5E.

The above embodiments have demonstrated that the present invention can be used for a single photon source with an ultralong anti-bunching timescale, a photonic quantum gate and/or an entangled N-photon state production device.

The above embodiments are scalable and have a photon coherence which is not limited by spontaneous emission.

The above embodiments have shown g(2)(0)~4% with optical pulses 40 times longer than the lifetime. Further, the coherence time of photons is much greater than the current measurement capabilities. It is possible to generate large entangled states with good scalability.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. An optical system comprising a charged quantum dot having, a charged carrier, first and second ground state levels and a plurality of excited state levels, the first and second ground state energy levels having different spin states such that the said charged carrier cannot transfer between the first and second ground state energy levels without changing its spin state, the system further comprising a controller adapted to control a first radiating beam with energy not more than 100 micro-eV from a first transition energy within said quantum dot from a first ground state level to a selected excited state level from the plurality of excited state levels, the system being adapted to enhance the decay rate of a second transition within said quantum dot from the selected excited state level to a second ground state level, but not a first transition, such that a photon is produced due to scattering of a photon from the first radiating beam, wherein the controller is adapted to irradiate the quantum dot with the first radiating beam for a time longer than the radiative lifetime of the selected excited state to produce just one photon, and wherein the first radiating beam comprises at least one pulse.

2. An optical system according to claim 1, wherein the first radiating beam is a pulsed beam with each pulse having a single intensity maximum, a pulse length greater than the selected excited state lifetime and the controller is adapted to control the pulse area to transfer all spin in the first ground state to the second ground state.

3. An optical system according to claim 1, wherein the controller is further adapted to control a second radiating beam that radiates the quantum dot at an energy within 100 micro-eV of the energy of said second transition, the said second radiating beam being a control beam, the control beam being applied to the quantum dot between two or more pulses of the first radiating beam, the controller being configured to control the first radiating beam such that the charged carrier has an energy state which is a superposition of the first and second ground state energy levels prior to the application of the control beam.

4. An optical system according to claim 1, configured as a source of entangled photons, wherein the controller is configured to control the first radiating beam such that the charged carrier has a superposed energy state which is a superposition of the first and second ground state energy levels, the controller being further adapted to control a second radiating beam to scatter at least one further photon to produce an entangled photon pair using said superposed energy state.

5. An optical system according to claim 4, configured as a source of n entangled photons, where n is an integer of at least 2, the controller being configured to control the second radiating beam to scatter at a plurality of photons to produce entangled photons using said superposed energy state.

6. An optical system according to claim 1, wherein the controller is configured to prepare the charged carrier in the first ground state level prior to irradiating with the first beam.

7. An optical system according to claim 1, wherein the first and second ground state levels are produced by an in-plane magnetic field.

8. An optical system according to claim 1, wherein the system is adapted to enhance the decay rate of a second transition by a cavity tuned to the frequency of the desired transition.

9. An optical system according to claim 1, wherein the system is adapted to enhance the decay rate of a second transition by a waveguide.

10. An optical system according to claim 1, wherein the system is adapted to selectively enhance the decay rate of second transition, but not a first transition, by only supporting a light polarisation that couples to the second transition and not first.

11. An optical system according to claim 1, wherein the first radiation beam is a narrow band beam having a linewidth less than the radiative linewidth of the transition.

12. An optical system according to claim 1, further comprising a filter adapted to pass Raman scattered photons out of the system.

13. An optical system according to claim 1, wherein the carrier in the ground state of the quantum dot is an electron or hole.

14. An optical system according to claim 1, wherein the system changes the probability of decay from the selected excited state to the second ground state to be greater than the probability of decay from the selected excited state to the first ground state.

15. An optical system according to claim 1, wherein a photon created from irradiation the first radiating beam has a length less than the lifetime of the spin in the ground state.

16. An optical system according to claim 1, wherein a laser used to provide the first radiating beam is not detuned from the transitions.

17. A method of operating an optical system, wherein the optical system comprises a quantum dot comprising a charged carrier, first and second ground state levels and a plurality of excited state levels, the first and second ground state energy levels having different spin states such that the said charged carrier cannot transfer between the first and second ground state energy levels without changing its spin state, the method comprising:
irradiating the quantum dot with a first radiating beam with an energy not more than 100 micro-eV from a first transition energy within said quantum dot from a first ground state level to a selected excited state level from the plurality of excited state levels,
wherein the system is adapted to enhance the decay rate of a second transition within said quantum dot from the selected excited state level to a second ground state level, but not a first transition, such that a photon is produced due to scattering of a photon from the first radiating beam, and
wherein the quantum dot is irradiated with the first radiating beam for a time longer than the radiative lifetime of the selected excited state to produce just one photon, and wherein the first radiating beam comprises at least one pulse.

18. A method according to claim 17, wherein the first radiating beam is a pulsed beam with each pulse having a single intensity maximum, a pulse length greater than the selected excited state lifetime, and the pulse area is controlled to transfer all spin in the first ground state to the second ground state.

19. A method according to claim 17, wherein a second radiating beam radiates the quantum dot at an energy within 100 micro-eV of the second transition energy, the said second radiating beam being a control beam, the control beam being applied to the quantum dot between two or more pulses of the first radiating beam, the first radiating beam being controlled such that the charged carrier has an energy state which is a superposition of the first and second ground state energy levels prior to the application of the control beam.

20. A method according to claim 17, adapted to produce entangled photons, wherein the first radiating beam radiates the quantum dot such that the charged carrier a superposed energy state which is a superposition of the first and second ground state energy levels, and wherein a second radiating beam radiates the quantum dot at an energy within 100 micro-eV of the second transition energy, the said second radiating beam being a control beam, the controller being further adapted to control a second radiating beam to scatter at least one further photon to produce an entangled photon pair using said superposed energy state.

* * * * *